(12) United States Patent
Bonen

(10) Patent No.: US 10,063,485 B2
(45) Date of Patent: *Aug. 28, 2018

(54) SYSTEM AND METHOD FOR FEEDBACK BASED TRAFFIC MANAGEMENT

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/674,383

(22) Filed: Aug. 10, 2017

(65) Prior Publication Data

US 2017/0346747 A1 Nov. 30, 2017

Related U.S. Application Data

(63) Continuation of application No. 15/095,563, filed on Apr. 11, 2016, now Pat. No. 9,749,248, which is a continuation of application No. 14/165,619, filed on Jan. 28, 2014, now Pat. No. 9,319,326.

(51) Int. Cl.
*H04L 12/26* (2006.01)
*H04L 12/851* (2013.01)

(52) U.S. Cl.
CPC ................................ *H04L 47/2433* (2013.01)

(58) Field of Classification Search
CPC .................................................. H04L 47/2433
See application file for complete search history.

(56) References Cited

U.S. PATENT DOCUMENTS

| 7,310,423 | B2 | 12/2007 | Hobrock et al. |
| 7,489,641 | B2 | 2/2009 | Miller et al. |
| 2006/0041815 | A1 | 2/2006 | Haymond |
| 2007/0195778 | A1 | 8/2007 | Tatar et al. |
| 2011/0310941 | A1 | 12/2011 | Kenington |
| 2015/0148074 | A1 | 5/2015 | Phan et al. |
| 2016/0037365 | A1* | 2/2016 | Makrakis ............. H04L 1/1825 370/252 |
| 2017/0155535 | A1* | 6/2017 | Hong .................. H04L 27/2649 |

* cited by examiner

*Primary Examiner* — Shukri Taha
(74) *Attorney, Agent, or Firm* — Brokaw Patent Law PC; Christopher J. Brokaw

(57) ABSTRACT

A communication system that may include a traffic management module and a communication interface module. The communication interface module is arranged to estimate a status of multiple channels by utilizing channel status estimators, generate filler packets in response to the status of the multiple channels; wherein the filler packets are associated with the multiple channels; send the filler packets to the traffic management module. The traffic management module is arranged to receive multiple input packets that are associated with multiple channels, receive the filler packets; apply a traffic management scheme on the multiple input packets and the filler packets to provide multiple intermediate packets that comprise (a) multiple filler traffic managed packets and (b) multiple non-filler traffic managed packets.

22 Claims, 5 Drawing Sheets

SYSTEM AND METHOD FOR FEEDBACK BASED TRAFFIC MANAGEMENT

CLAIM OF PRIORITY

The present application is a continuation of, and claims priority to, U.S. Non-Provisional patent application Ser. No. 15/095,563, entitled "System and Method for Feedback Based Traffic Management," invented by Adi Bonen, filed on Apr. 11, 2016, the disclosure of which is hereby incorporated by reference for all purposes as if fully set forth herein.

The parent application U.S. Non-Provisional patent application Ser. No. 15/095,563 is itself a continuation of, and claims priority to, U.S. Pat. No. 9,319,326, entitled "System and Method for Feedback Based Traffic Management," invented by Adi Bonen, filed on Jan. 28, 2014, the disclosure of which is hereby incorporated by reference for all purposes as if fully set forth herein.

BACKGROUND

Today's advance traffic management (TM) in networking application specific integrated circuits (ASICs) and other networking processors are capable of scheduling a very large number of flows through a multitude of independent or hierarchical channels. It is possible to apply rate limits to flows, group of flows, channels, and various virtual constructs. These rate limits are defined by software to set values. When the capacity of channels is time variant, or when the virtual rate limit construct cannot accurately follow the channel capacity, there is a need to apply feedback mechanism that will change these rate limits according to the actual channel capacity or level of occupancy. Current feedback implementations are normally software based, this is done by measuring buffers/queues attached to the physical channels, analyzing their fullness, applying a control loop to consider past and current buffer fullness and predict future behaviors, and applying correction factors to the TM rate controls in an attempt to bring the buffers to a desired level.

This is a tedious operation that institutes a burden to the controlling central processing unit (CPU) and the TM interface and update mechanism. The TM and the software drivers are not normally designed for such a feedback mechanism to be applied fast and frequently. The update process is relatively slow, and requires expensive CPU resources. Accordingly, the update rate cannot be too frequent (e.g., every 1 second). This results in less than optimal utilization of the channel capacity, higher latency and jitter in the physical channel queues, and risk of overflow and underflow in these queues.

Data Over Cable Service Interface Specification (DOCSIS) 3.0 overlapping bonding group requires hierarchical virtual construct of individual channels and various sizes of groups of channels. The channel groups can be contained in each other or partially overlap each other.

While the TM can be configured to schedule packets from a large number of flows through the different channels and group of channels, the TM process and exact decisions cannot be signaled outside the TM. When the packets and flows are later assigned to actual physical channels, there can be divergence from the TM intended assignment and scheduling that will cause some channels to receive too much traffic while other channels are not completely full.

The capacity of a DOCSIS 3.1 channel is not constant, and dependent on the traffic itself. The DOCSIS 3.1 channel concurrently uses multiple profiles which have different modulation depth, resulting in different channel capacity depending on the relative amount of data on each profile. If more data is destined to a deeper modulation profile, the channel capacity increases, and vice versa. Several other varying parameters further increase the possible variation in the channel capacity throughput. The TM has no visibility into the parameters that can change the channel throughput. Thus a rapid feedback mechanism is required to adjust the TM rate shaping limits according to the ongoing capacity changes of the channel.

The capacity of a wireless channel may rapidly change due to variations in the physical conditions in the path between a transmitter and a receiver. The channel modem may employ methods to detect these varying conditions and change the channel transmission parameters to adapt to them, which results in changes to data carrying capacity in the channel. A feedback mechanism is required to adapt rate shaping parameters in the TM scheduling data into the transmitter according to the channel capacity changes.

SUMMARY

According to an embodiment of the invention there may be provided a communication system for traffic management.

In an embodiment, the communication system may include a traffic management module and a communication interface module. The communication interface module may be arranged to estimate a status of multiple channels by utilizing hardware channel status estimators. The communication interface module may generate filler packets in response to the status of the multiple channels. The filler packets are associated with the multiple channels. The communication interface module may send the filler packets to the traffic management module. The traffic management module is arranged to receive multiple input packets that are associated with multiple channels. The traffic management module receives the filler packets and applies a traffic management scheme on the multiple input packets and the filler packets to provide multiple intermediate packets that comprise (a) multiple filler traffic managed packets and (b) multiple non-filler traffic managed packets. The communication interface module may be further arranged to receive the multiple intermediate packets, extract the multiple non-filler traffic managed packets, and transmit the multiple non-filler traffic managed packets over the multiple channels.

The traffic management module is prevented from accurately tracking the status of the multiple channels.

The traffic management module is prevented from discarding the filler packets. The traffic management module may be arranged to associate with the filler packets a priority level that exceeds a priority level of at least some of the input packets.

The communication interface module may be arranged to associate with the filler packets a priority level that exceeds a priority level of at least a majority of the input packets.

The communication interface may be arranged to generate filler packets that are associated with a channel out of the multiple channels in response to a capacity of the channel.

An increase in a capacity of the channel may result in a decrement in an aggregate size of filler packets generated by the communication interface in association with the channel.

An increase in a capacity of the channel may result in a decrement in a value of a filler stream volume parameter embedded in filler packets generated by the communication interface in association with the channel.

The communication interface may be arranged to determine a capacity of a channel and to generate filler packets associated with the channel so that a sum of (a) a number of filler packets that are associated with the channel, and (b) a number of non-filler traffic managed packets that are associated with the channel tracks a (c) a maximal capacity of the channel or any other fixed (or non-fixed) threshold.

The hardware channel status estimators may be arranged to estimate a capacity of a channel of the multiple channels in response to a fullness level of a buffer allocated to the channel.

The channels may be DOCSIS compliant channels.

According to an embodiment of the invention, there may be provided a method that may include estimating by a communication interface module a status of multiple channels by utilizing hardware channel status estimators; generating by a communication interface module filler packets in response to the status of the multiple channels. The filler packets are associated with the multiple channels. Then, the communication interface module sends the filler packets to a traffic management module. The traffic management module receives multiple input packets that are associated with multiple channels and receives the filler packets. The traffic management module applies a traffic management scheme on the multiple input packets and the filler packets to provide multiple intermediate packets that may include (a) multiple filler traffic managed packets and (b) multiple non-filler traffic managed packets. The communication interface module receives the multiple intermediate packets, extracts the multiple non-filler traffic managed packets, and transmits the multiple non-filler traffic managed packets over the multiple channels.

The method may include preventing the traffic management module from accurately tracking the status of the multiple channels.

The method may include preventing the traffic management module from discarding the filler packets.

The method may include associating with the filler packets a priority level that exceeds a priority level of at least some of the input packets.

The method may include associating with the filler packets a priority level that exceeds a priority level of at least a majority of the input packets.

The method may include generating filler packets that are associated with a channel out of the multiple channels in response to a capacity of the channel.

An increase in a capacity of the channel may result in a decrement in an aggregate size of filler packets generated by the communication interface in association with the channel.

An increase in a capacity of the channel may result in a decrement in a value of a filler stream volume parameter embedded in filler packets generated by the communication interface in association with the channel.

The method may include determining a capacity of a channel and to generate filler packets associated with the channel so that a sum of (a) a number of filler packets that are associated with the channel, and (b) a number of non-filler traffic managed packets that are associated with the channel tracks a (c) a maximal capacity of the channel or any other fixed (or non-fixed) threshold.

The method may include estimating a capacity of a channel of the multiple channels in response to a fullness level of a buffer allocated to the channel.

According to an embodiment of the invention there may be provided a non-transitory computer readable medium that stores instructions that once executed by a computer cause the computer to execute the stages of estimating a status of multiple channels by utilizing hardware channel status estimators; generating filler packets in response to the status of the multiple channels; wherein the filler packets are associated with the multiple channels; sending the filler packets to a traffic management module; receiving multiple input packets that are associated with multiple channels; receiving the filler packets; applying a traffic management scheme on the multiple input packets and the filler packets to provide multiple intermediate packets that may include (a) multiple filler traffic managed packets and (b) multiple non-filler traffic managed packets; receiving the multiple intermediate packets; extract the multiple non-filler traffic managed packets; and transmitting the multiple non-filler traffic managed packets over the multiple channels.

The non-transitory computer readable medium may store instructions for preventing the traffic management module from accurately tracking the status of the multiple channels.

The non-transitory computer readable medium may store instructions for preventing the traffic management module from discarding the filler packets.

The non-transitory computer readable medium may store instructions for associating with the filler packets a priority level that exceeds a priority level of at least some of the input packets.

The non-transitory computer readable medium may store instructions for associating with the filler packets a priority level that exceeds a priority level of at least a majority of the input packets.

The non-transitory computer readable medium may store instructions for generating filler packets that are associated with a channel out of the multiple channels in response to a capacity of the channel.

An increase in a capacity of the channel may result in a decrement in an aggregate size of filler packets generated by the communication interface in association with the channel.

An increase in a capacity of the channel may result in a decrement in a value of a filler stream volume parameter embedded in filler packets generated by the communication interface in association with the channel.

The non-transitory computer readable medium may store instructions for determining a capacity of a channel and to generate filler packets associated with the channel so that a sum of
(a) a number of filler packets that are associated with the channel, and (b) a number of non-filler traffic managed packets that are associated with the channel tracks a (c) a maximal capacity of the channel or any other fixed (or non-fixed) threshold.
(b) The non-transitory computer readable medium may store instructions for estimating a capacity of a channel of the multiple channels in response to a fullness level of a buffer allocated to the channel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
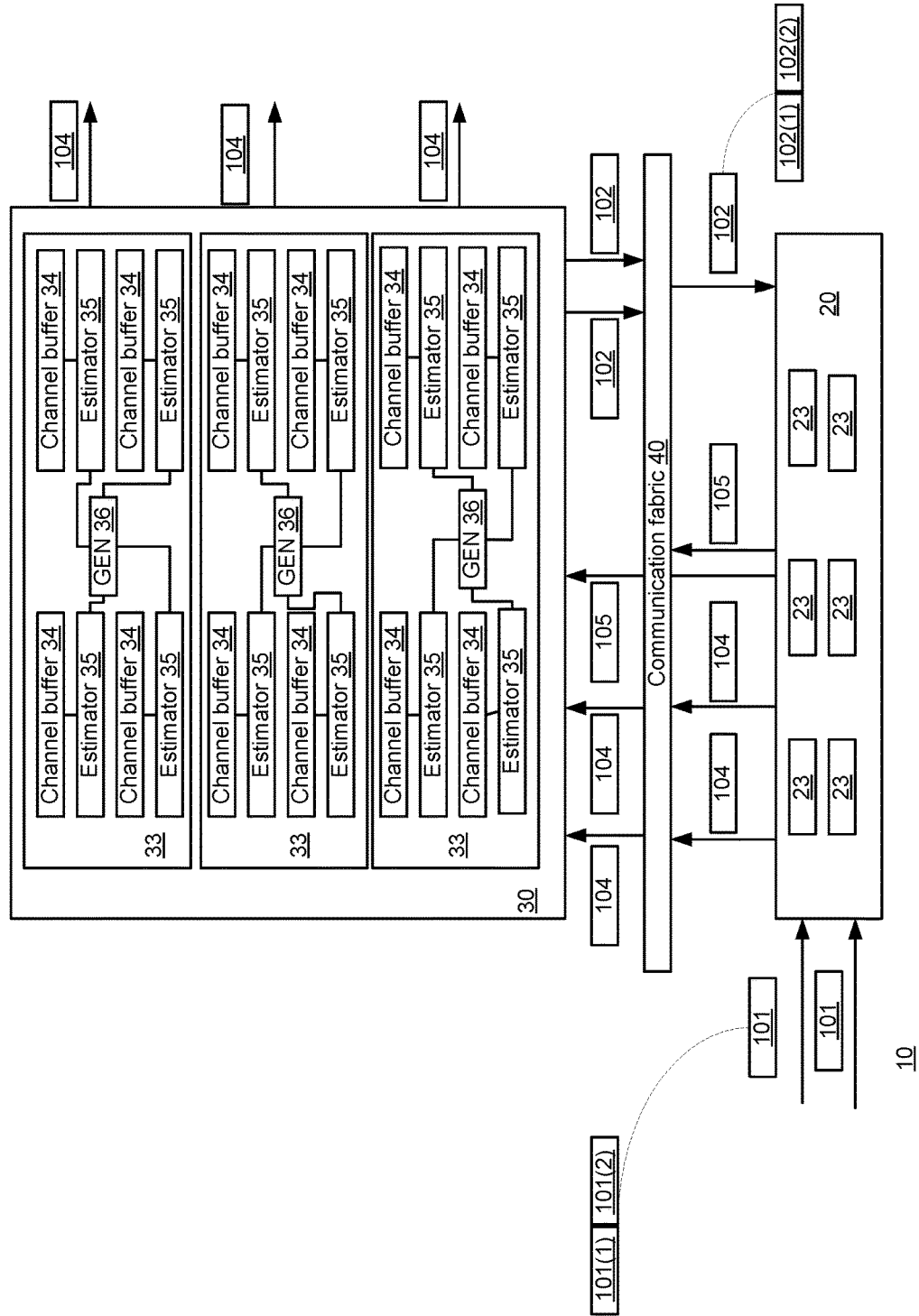
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The terms "channel" and "physical channel" are used in an interchangeable manner. A channel means a medium resource for conveying communication traffic.

There is provided a fast acting hardware mechanism to provide continuous feedback to the TM without requiring real time software control, and without requiring changes to the programmed rate limits in the TM.

The physical channel queue/buffer fullness is tracked and evaluated by a hardware mechanism that can be directly attached to the channel. Non-limiting examples of hardware mechanisms may include counters that count the number of packets per channel queue, monitors for monitoring address lines of a memory that stores packets, processors that process the counter values and/or addresses to determine the channel capacity, and the like.

That feedback control mechanism creates a filler filler-flow that includes filler packets for each controlled (traffic managed) channel. The rate of each filler-flow is inversely related to the channel capacity, such that the filler flow rate is zero for a maximum channel rate, and maximized for the minimum channel rate.

Alternative implementation can directly tie the filler flow rate to the time varying queue occupancy of the channel, or to the time varying channel capacity minus the traffic directed to the channel.

Each physical channel's filler-flow is directed back to the TM and forwarded such that it is turned around to use a queue and rate shaper directly associated with the channel that is being traffic shaped. The filler-flow may also be assigned high priority at the TM, even at the expense of regular traffic directed to that channel. Thus the rate of regular traffic allowed by the TM into each channel is immediately affected by the varying rate of the filler-flow for that channel.

Similarly, the rate of regular traffic allowed by the TM into each virtual hierarchical construct of a group of channels is immediately affected by the varying rate of all the filler-flows for these multiple channels. Specifically, as the rate of a filler-flow increases, the rate of regular data passed by the TM into the filler-flow's channel decreases by the same amount. When the combined traffic composed of regular data and filler-flow arrives at the channel, the channel-attached mechanism detects and drops every packet in the filler-flow such that only regular data is forwarded to the buffers/queues attached to the physical channel.

According to another embodiment of the invention, instead of creating a filler-flow with an actual desired rate, the physical channel attached feedback mechanism generates special information packets that convey to the TM the rate of the filler-flow. These special information packets may also be referred to as virtual filler-flow.

These information packets will have a much lower actual data rate. The TM receives the information packets and applies the conveyed rate to the rate limiters without actually passing data through.

FIG. 1 illustrates a communication system 10 according to an embodiment of the invention.

Communication system 10 includes traffic management module 20, communication interface module 30 and communication fabric 40.

The input packets 101 are associated with multiple channels—each packet 101 is destined to be sent over a certain channel. The destination channel information may be identified by a field included in the header of the packet but this is not necessarily so.

The traffic management module 20 includes one or more network processors 23 for applying traffic management schemes on incoming packets. This may include scheduling a transmission of packets over channels, compressing packet streams, deletion of packets, duplicating of packets, prioritizing of the transmission of packets, and the like.

The network processors 23 may be arranged in one or more printed circuit boards and at the absence of feedback from the communication interface module 30 is prevented from accurately estimating the state of the channels.

The communication interface module 30 may include one or more line cards 33 that in turn may include multiple channel buffers 34, each channel buffer 34 may store packets destined to a channel and multiple hardware channel status estimators 35 that are arranged to estimate the status of the channels. The estimation may be based upon monitoring the fullness of channel buffers or may be based upon any known method for estimation of the status of the channel. Accordingly, the multiple hardware channel status estimators 35 are arranged to monitor the status of channels and send monitoring results to a filler packet generator (denoted "GEN"). The filler packet generator 36 is arranged to generate filler packets 102 in response to the status of the channels.

Filler packets of a certain channel may be dummy packets that have an insignificant content but are tagged as being destined to the channel. In this case the number and size of filler packets may be set in response to the status of the channel.

For example, the filler packet generator may increase the number of filler packets of a channel following a decrease in the capacity of the channel.

Yet for another example associated with a particular system embodying fixed-size packets—a sum of (a) a number of filler packets that are associated with the channel, and (b) a number of non-filler traffic managed packets that are associated with the channel tracks (c) a maximal capacity of the channel or any other fixed (or non-fixed) threshold.

In cases where the packets are not fixed sized then the sum of the aggregate size of the filler packets that are associated with the channel, and (b) the aggregate size of non-filler traffic managed packets that are associated with the channel tracks a maximal capacity of the channel or any other fixed (or non-fixed) threshold.

Any reference to an aggregate size of packets can be interpreted to a reference to a rate—thus, the sum of the rate of a filler packet stream and a rate of the non-filler traffic managed packets should track the maximal capacity of the channel or any other fixed (or non-fixed) threshold.

Accordingly, the size of filler packets and their number can be controlled by the feedback mechanism.

Figure 2:
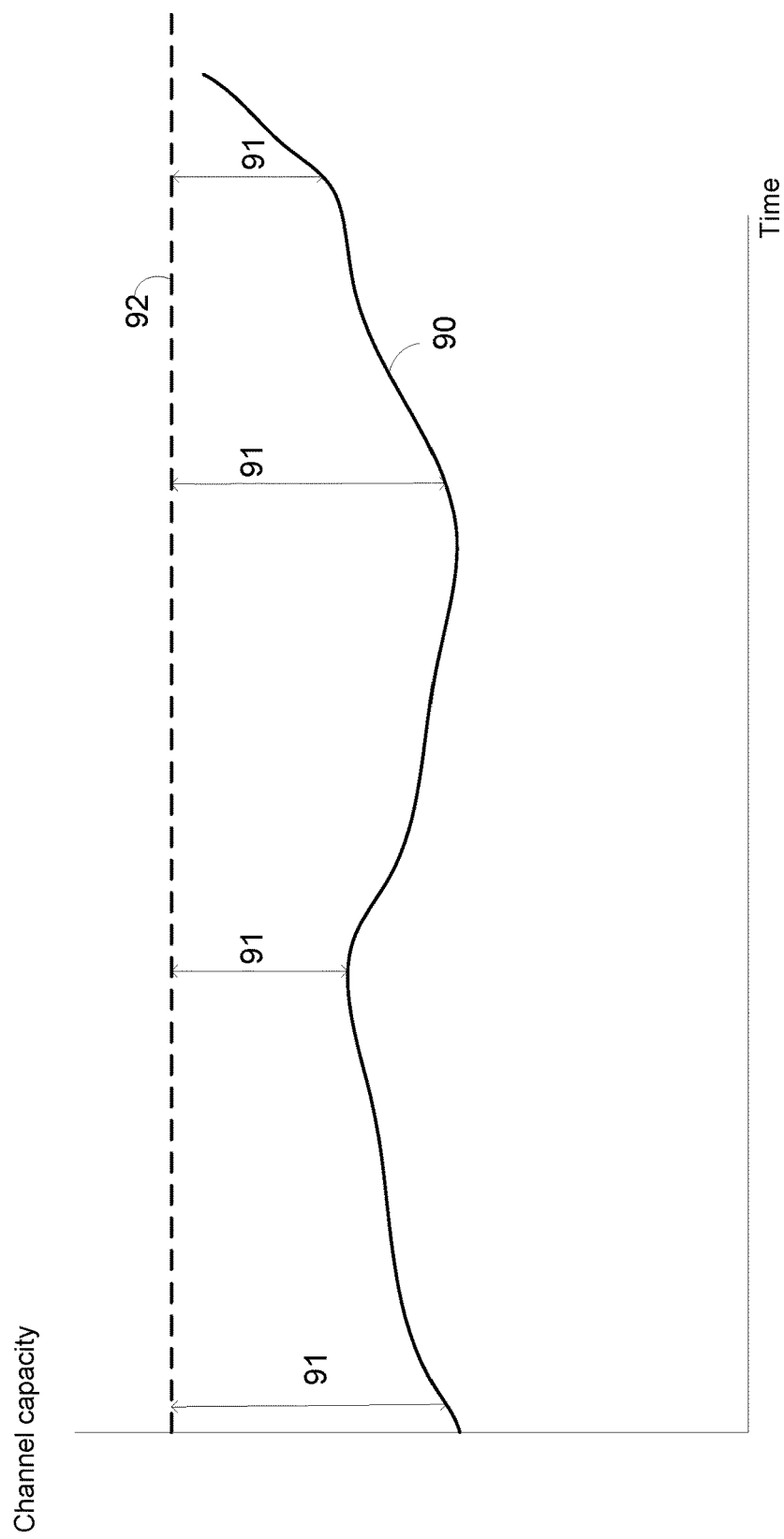
FIG. 2 illustrates a state of a channel and the rate of the filler-flow according to an embodiment of the invention.

FIG. 2 illustrates a state of a channel and the rate of a filler-packet stream according to an embodiment of the invention.

Curve 90 illustrates the changes in the capacity of a channel over a period of time. The distance 91 between curve 90 and imaginary line 92 represents the rate of the filler packet stream to be generated in order to maintain a fixed sum. The imaginary line 92 may represent a maximal capacity of the channel or a capacity that may differ from that maximal capacity.

Referring back to FIG. 1, the filler packets are sent from the communication interface module 30 to the traffic management module 20.

The traffic management module 20 may then apply a traffic management scheme on the multiple input packets 101 and the filler packets 102 to provide multiple intermediate packets. Input packets 101 may include payload 101(1) and header 101(2). The header may include a channel identifier. Filler packets 102 may include payload 102(1) and header 102(2). The header may include a channel identifier.

The intermediate packets include:
a. Multiple filler traffic managed packets 104 that are filler packets that were traffic management processed.
b. Multiple non-filler traffic managed packets 105 that are input packets that were traffic management processed.

The traffic management module 20, upon reception of the filler packets will apply the traffic management scheme under a known assumption that determines the rate and/or other parameters of the combined intermediate packets (e.g., rate shaping to the maximum channel capacity). Through the variable rate of the filler packet stream, the rate of the non-filler traffic managed packets 105 is matched to the capacity of the channel. This known assumption is "known" in the sense that it is known to the traffic management module 20 and to the communication interface module 30, which generates filler packets at a rate guided by that assumption.

Because the communication interface module may perform load balancing to assign packets to one of multiple possible channels that are connected to the packet destination, change the modulation depth of any channel, which changes the channel capacity, change forward error protection scheme to fit the level of error protection to the packet and its destination, or apply other traffic and channel affecting operations on traffic managed packets from the traffic management module 20, and because the filler packet stream generated by communication interface module 30 are affected by the results of these traffic and channel operations, these filler-flows may virtually synchronize between the decisions made by the traffic management module 20 and the communication interface module 30.

The communication interface module 30 may then receive the multiple packets 104 and 105, extract the multiple non-filler traffic managed packets 104 and transmit the multiple non-filler traffic managed packets 104 over the multiple channels.

In this embodiment the filler packets include insignificant content and the traffic management module 20 may be unaware to the fact that they are filler packets and is prevented from discarding the filler packets.

In order to guarantee that the traffic management module 20 takes into account the filler packets the communication interface module 20 may be arranged to associate with the filler packets a priority level that exceeds a priority level of at least some of the input packets, of a majority of the input packets 101 or of all of the input packets 101. The priority may be indicated by a field within the filler packets but any other method for assigning priority to packets may be applied.

The channels may be DOCSIS compliant channels, but this is not necessarily so. The channels may be wireless channels for a cellular or other wireless system, but this is not necessarily so.

Figure 3:
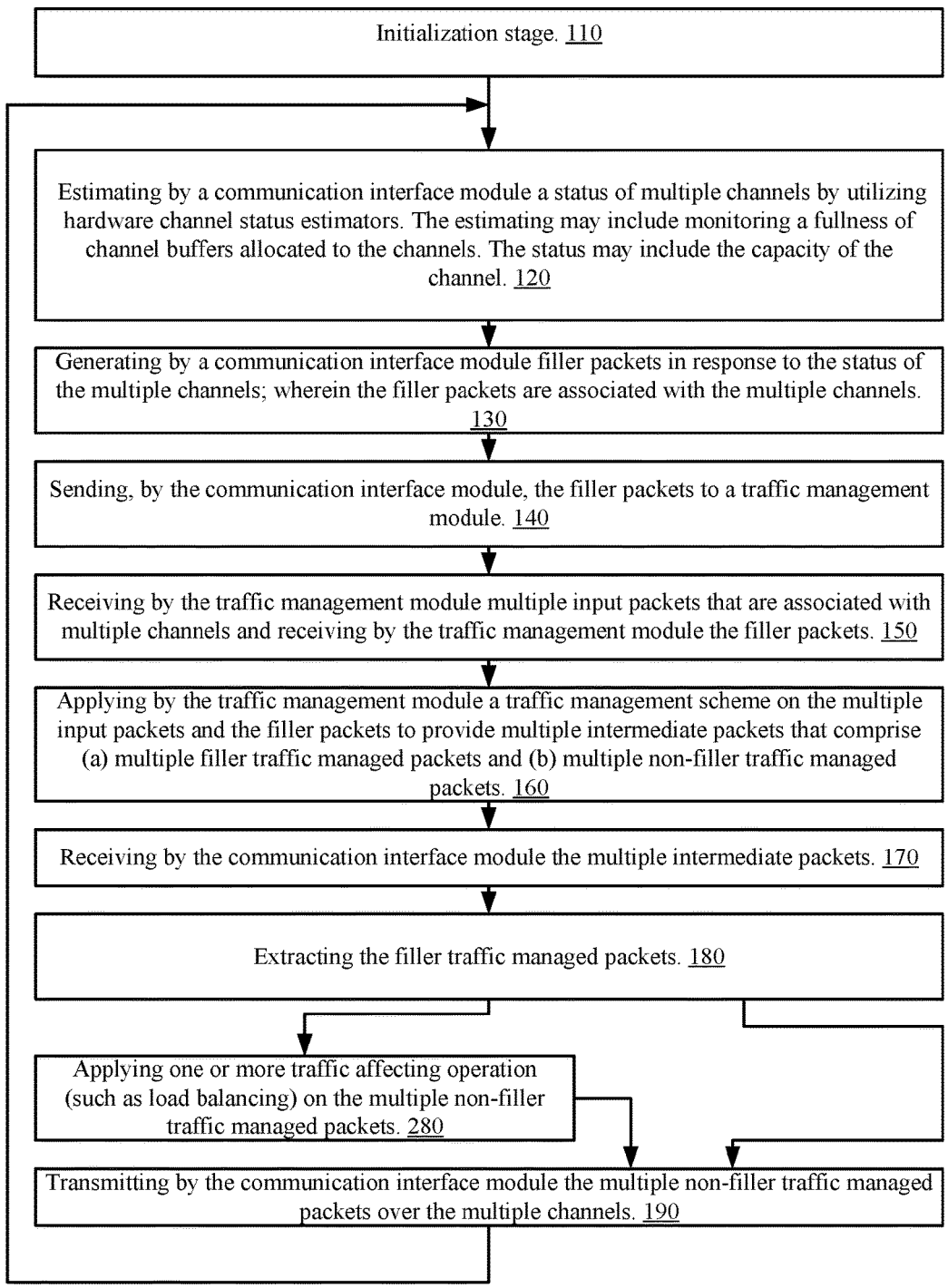
FIG. 3 illustrates a method according to an embodiment of the invention.

FIG. 3 illustrates method 100 according to an embodiment of the invention.

Method 100 starts by initialization stage 110. In this stage the traffic management scheme may be determined or received, parameters for generating filler packets (especially the relationship between a capacity of a channel and filler packets to be generated) may be received or determined.

Stage 110 may be followed by stage 120 of estimating by a communication interface module a status of multiple channels by utilizing hardware channel status estimators. The estimating may include monitoring a fullness of channel buffers allocated to the channels. The status may include the capacity of the channel.

Stage 120 may be followed by stage 130 of generating by a communication interface module filler packets in response to the status of the multiple channels, where the filler packets are associated with the multiple channels.

Stage 130 may include generating filler packets that are associated with a channel out of the multiple channels in response to a capacity of the channel. An increase in a capacity of the channel may result in a decrement in a number and/or size of filler packets (and/or in a rate of a filler packet stream) generated by the communication interface in association with the channel.

Stage 130 may include determining a capacity of a channel and to generate filler packets associated with the channel so that a sum of (a) a number of bytes in filler packets that are associated with the channel, and (b) a number of bytes in non-filler traffic managed packets that are associated with the channel tracks a (c) a maximal capacity of the channel or any other fixed (or non-fixed) threshold.

Stage 130 may include associating with the filler packets a priority level that exceeds a priority level of at least some of the input packets, at least a majority of the input packets, or all of the input packets.

Stage 130 may be followed by stage 140 of sending, by the communication interface module, the filler packets to a traffic management module.

Stage 140 may be followed by stage 150 of receiving by the traffic management module multiple input packets from multiple individual traffic flows that are associated with multiple channels and receiving by the traffic management module the filler packets.

Stage 150 may be followed by stage 160 of applying by the traffic management module a traffic management scheme on the multiple input packets and the filler packets to provide multiple intermediate packets that comprise (a) multiple filler traffic managed packets and (b) multiple non-filler traffic managed packets. The traffic management scheme may cause dropping part of the input packets such that the intermediate packets for each channel are not more than an established data rate.

Stage 160 may be followed by stage 170 of receiving by the communication interface module the multiple intermediate packets.

Stage 170 may be followed by stage 180 of extracting the multiple non-filler traffic managed packets.

Stage 180 may include dropping the multiple filler traffic managed packets.

Stage 180 may be followed by stage 280 or by stage 190. Stage 280 may be followed by stage 190.

Stage 280 may include applying one or more traffic affecting operation (such as load balancing) on the multiple non-filler traffic managed packets. This stage may include for example performing load balancing to assign packets to one of multiple possible channels that are connected to the packet destination, changing the modulation depth of any channel, changing forward error protection scheme to fit the level of error protection appropriate to the packet and its destination, or applying any other traffic and channel affecting operations on traffic managed packets.

Stage 190 may include transmitting by the communication interface module the multiple non-filler traffic managed packets over the multiple channels. Stage 190 may be followed by stage 120.

According to another embodiment of the invention filler packets of a certain channel may include metadata reflecting the status of the channel and should be tagged as conveying such metadata.

Figure 4:
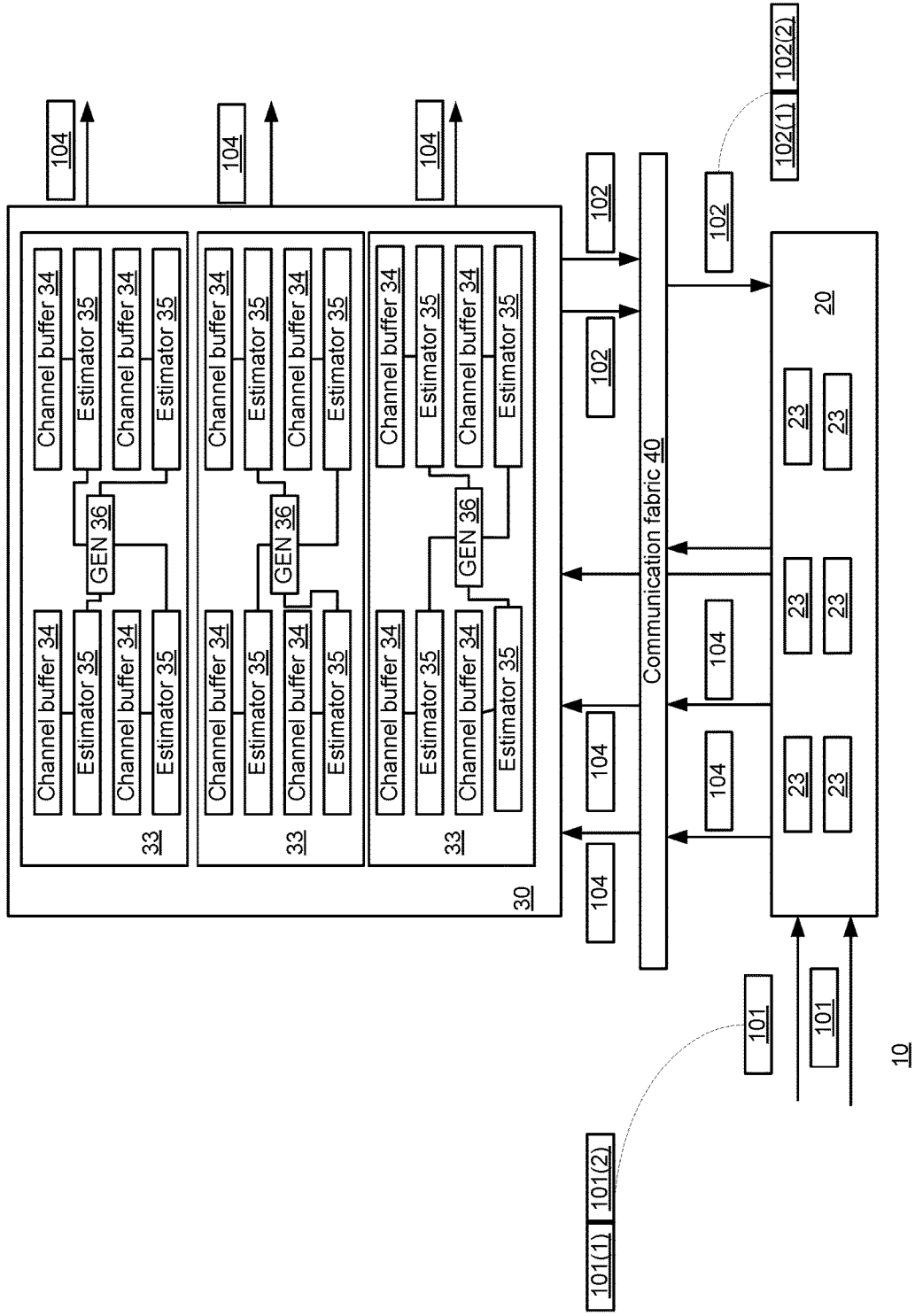
FIG. 4 illustrates a system according to an embodiment of the invention.

FIG. 4 illustrates system 10 according to an embodiment of the invention. FIG. 4 differs from FIG. 1 by not showing filler traffic managed packets 105 as such packets are not generated by the traffic management module 20.

The metadata and a tag indicative of the presence of metadata may be included in fields 102(1) and/or 102(2) of the filler packets 102.

This will allow the traffic management module 20 to receive in real time accurate estimates of the status of the channels and perform traffic management operations that are responsive to the status of the channels.

In this case the filler packets are sent to the traffic management module 20 that is arranged to apply a traffic management scheme on the multiple input packets and the filler packets to provide multiple non-filler traffic managed packets.

The traffic management scheme is responsive to the metadata reflecting the status of the channels. The communication interface module 30 is arranged to receive the multiple non-filler traffic managed packets and transmit the multiple non-filler traffic managed packets over the multiple channels.

An increase in the capacity of the channel may result in a decrement in a value of a filler stream volume parameter embedded in filler packets generated by the communication interface in association with the channel.

Figure 5:
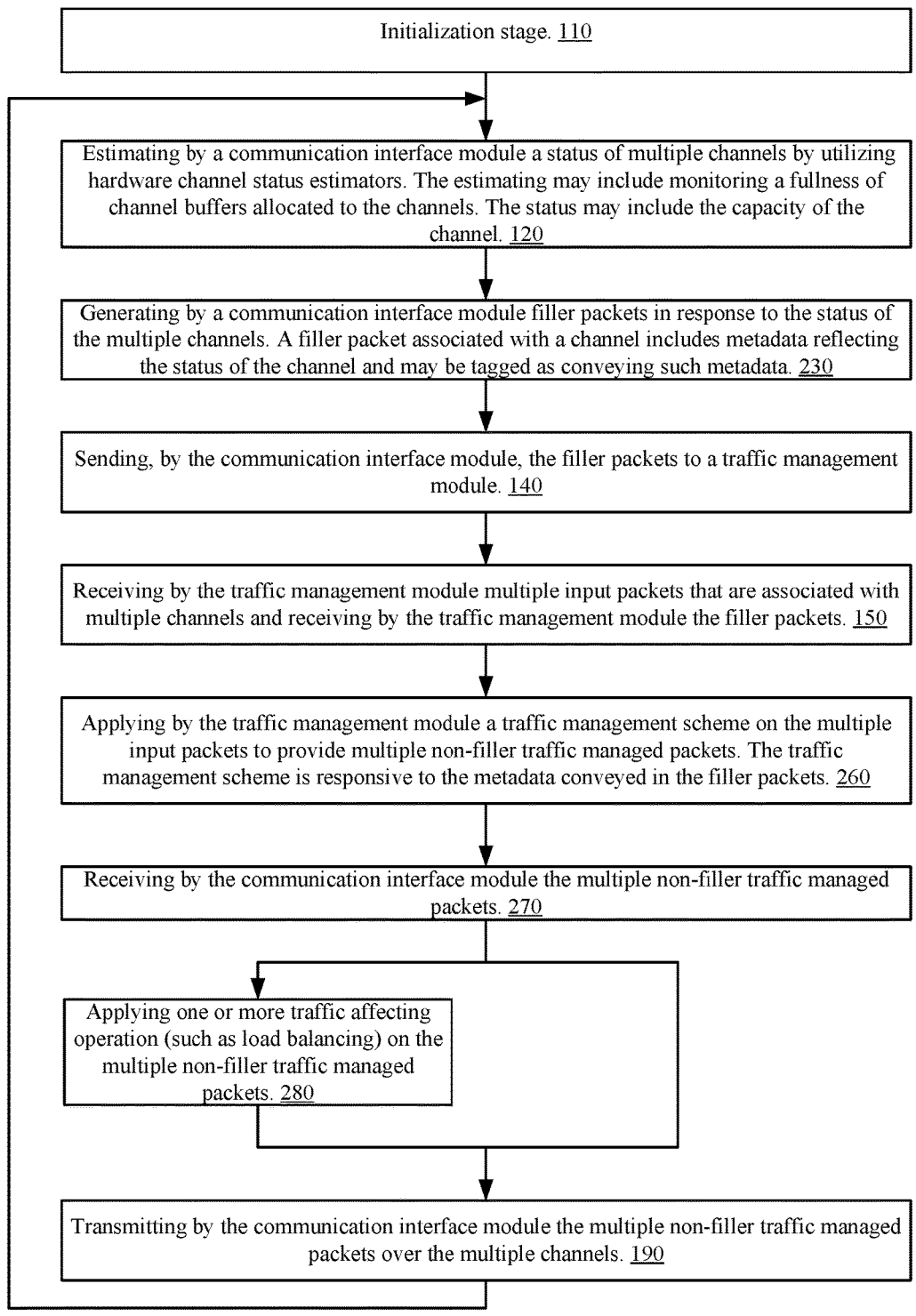
FIG. 5 illustrates a method according to an embodiment of the invention.

FIG. 5 illustrates method 200 according to an embodiment of the invention.

Method 200 starts by initialization stage 110.

Stage 110 may be followed by stage 120 of estimating by a communication interface module a status of multiple channels by utilizing hardware channel status estimators. The estimating may include monitoring a fullness of channel buffers allocated to the channels. The status may include the capacity of the channel.

Stage 120 may be followed by stage 230 of generating by a communication interface module filler packets in response to the status of the multiple channels. The filler packets are associated with the multiple channels—each filler packet may be associated with a single channel. A filler packet associated with a channel may include metadata reflecting the status of the channel and may be tagged as conveying such metadata.

An increase in a capacity of a channel may result in a decrement in a value of a filler channel capacity parameter embedded in filler information packets generated by the communication interface in association with the channel.

Stage 230 may include associating with the filler information packets a priority level that exceeds a priority level of at least some of the input packets, at least a majority of the input packets or all of the input packets.

Stage 230 may be followed by stage 140 of sending, by the communication interface module, the filler packets to a traffic management module.

Stage 140 may be followed by stage 150 of receiving by the traffic management module multiple input packets that are associated with multiple channels and receiving by the traffic management module the filler packets.

Stage 150 may be followed by stage 260 of applying by the traffic management module a traffic management scheme on the multiple input packets to provide multiple non-filler traffic managed packets. The traffic management scheme is responsive to the metadata conveyed in the filler packets. The traffic management scheme may cause dropping part of the input packets such that the intermediate packets for each channel are not more than the actual channel capacity estimated in stage 120.

Stage 260 may be followed by stage 270 of receiving by the communication interface module the multiple non-filler traffic managed packets.

Stage 270 may be followed by stage 280 of applying one or more traffic affecting operation (such as load balancing) on the multiple non-filler traffic managed packets. Stage 280 may be followed by stage 190. Alternatively, stage 270 may be followed by stage 190.

Stage 280 may include for example performing load balancing to assign packets to one of multiple possible channels that are connected to the packet destination, changing the modulation depth of any channel, changing forward error protection scheme to fit the level of error protection appropriate to the packet and its destination, or applying any other traffic and channel affecting operations on traffic managed packets.

Stage 190 may include transmitting by the communication interface module the multiple non-filler traffic managed packets over the multiple channels.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A communication system, comprising:
   a traffic management module; and
   a communication interface module, wherein the communication interface module is arranged to:
   estimate a status of multiple channels by utilizing channel status estimators,
   generate filler packets in response to the status of the multiple channels, wherein
   the filler packets are associated with the multiple channels,
   send the filler packets to the traffic management module; wherein
   the traffic management module is arranged to:
   receive multiple input packets that are associated with multiple channels; receive the filler packets,
   apply a traffic management scheme on the multiple input packets and the filler packets to provide multiple intermediate packets that comprise (a) multiple filler traffic managed packets and (b) multiple non-filler traffic managed packets, and
   wherein the communication interface module is further arranged to:
   receive the multiple intermediate packets;
   extract the multiple non-filler traffic managed packets; and
   transmit the multiple non-filler traffic managed packets over the multiple channels.

2. The communication system according to claim 1, wherein the traffic management module is prevented from accurately tracking the status of the multiple channels.

3. The communication system according to claim 1, wherein the traffic management module is prevented from discarding the filler packets.

4. The communication system according to claim 1, wherein the traffic management module is arranged to associate with the filler packets a priority level that exceeds a priority level of at least some of the input packets.

5. The communication system according to claim 1, wherein the communication interface module is arranged to associate with the filler packets a priority level that exceeds a priority level of at least a majority of the input packets.

6. The communication system according to claim 1, wherein the communication interface is arranged to generate filler packets that are associated with a channel out of the multiple channels in response to a capacity of the channel.

7. The communication system according to claim 1, wherein an increase in a capacity of the channel results in a decrement in an aggregate size of filler packets generated by the communication interface in association with the channel.

8. The communication system according to claim 1, wherein an increase in a capacity of the channel results in a decrement in a value of a filler stream volume parameter embedded in filler packets generated by the communication interface in association with the channel.

9. The communication system according to claim 1, wherein the communication interface is arranged to determine a capacity of a channel and to generate filler packets associated with the channel so that a sum of (a) a number of filler packets that are associated with the channel, and (c) a number of non-filler traffic managed packets that are associated with the channel tracks a threshold.

10. The communication system according to claim 1, wherein the channel status estimators are arranged to estimate a capacity of a channel of the multiple channels in response to a fullness level of a buffer allocated to the channel.

11. The communication system according to claim 1, wherein the channels are DOCSIS compliant channels.

12. A method, comprising:
estimating by a communication interface module a status of multiple channels by utilizing channel status estimators;

generating by a communication interface module filler packets in response to the status of the multiple channels; wherein the filler packets are associated with the multiple channels;

sending by the communication interface module, the filler packets to a traffic management module;

receiving by the traffic management module multiple input packets that are associated with multiple channels;

receiving by the traffic management module the filler packets;

applying by the traffic management module a traffic management scheme on the multiple input packets and the filler packets to provide multiple intermediate packets that comprise (a) multiple filler traffic managed packets and (b) multiple non-filler traffic managed packets;

receiving by the communication interface module the multiple intermediate packets;

extracting the multiple non-filler traffic managed packets; and transmitting by the communication interface module the multiple non-filler traffic managed packets over the multiple channels.

13. The method according to claim 12, further comprising preventing the traffic management module from accurately tracking the status of the multiple channels.

14. The method according to claim 12, further comprising preventing the traffic management module from discarding the filler packets.

15. The method according to claim 12, further comprising associating with the filler packets a priority level that exceeds a priority level of at least some of the input packets.

16. The method according to claim 12, further comprising associating with the filler packets a priority level that exceeds a priority level of at least a majority of the input packets.

17. The method according to claim 12, further comprising generating filler packets that are associated with a channel out of the multiple channels in response to a capacity of the channel.

18. The method according to claim 12, wherein an increase in a capacity of the channel results in a decrement in an aggregate size of filler packets generated by the communication interface in association with the channel.

19. The method according to claim 12, wherein an increase in a capacity of the channel results in a decrement in a value of a filler stream volume parameter embedded in filler packets generated by the communication interface in association with the channel.

20. The method according to claim 12, further comprising determining a capacity of a channel and to generate filler packets associated with the channel so that a sum of (a) a number of filler packets that are associated with the channel, and (b) a number of non-filler traffic managed packets that are associated with the channel tracks a threshold.

21. The method according to claim 12, further comprising estimating a capacity of a channel of the multiple channels in response to a fullness level of a buffer allocated to the channel.

22. A non-transitory computer readable medium that stores instructions that once executed by a computer cause the computer to execute the stages of:

estimating a status of multiple channels by utilizing channel status estimators;

generating filler packets in response to the status of the multiple channels, wherein the filler packets are associated with the multiple channels;

sending the filler packets to a traffic management module;

receiving multiple input packets that are associated with multiple channels;

receiving the filler packets;

applying a traffic management scheme on the multiple input packets and the filler packets to provide multiple intermediate packets that comprise (a) multiple filler traffic managed packets and (b) multiple non-filler traffic managed packets;

receiving the multiple intermediate packets;

extracting the multiple non-filler traffic managed packets; and transmitting the multiple non-filler traffic managed packets over the multiple channels.

* * * * *